US008564816B2

(12) United States Patent
Kiriyama

(10) Patent No.: US 8,564,816 B2
(45) Date of Patent: Oct. 22, 2013

(54) IMAGE FORMING APPARATUS AND METHOD FOR CONTROLLING IMAGE FORMING APPARATUS

(75) Inventor: Tomohiro Kiriyama, Yamanashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 312 days.

(21) Appl. No.: 12/917,656

(22) Filed: Nov. 2, 2010

(65) Prior Publication Data

US 2011/0102840 A1 May 5, 2011

(30) Foreign Application Priority Data

Nov. 5, 2009 (JP) ................................ 2009-253655

(51) Int. Cl.
*G06F 15/00* (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

2006/0029445 A1* 2/2006 Nakamura et al. ............ 399/329

FOREIGN PATENT DOCUMENTS

| | | |
|---|---|---|
| JP | 2006-015683 A | 1/2006 |
| JP | 2007-050526 A | 3/2007 |
| JP | 2009-118108 A | 5/2009 |

OTHER PUBLICATIONS

Japanese Office Action dated Jun. 11, 2013 (and English translation thereof) in counterpart Japanese Application No. 2009-253655.

Japanese Office Action dated Aug. 27, 2013 (and English translation thereof) in counterpart Japanese Application No. 2009-253655.

* cited by examiner

*Primary Examiner* — Saeid Ebrahimi Dehkordy

(74) *Attorney, Agent, or Firm* — Holtz, Holtz, Goodman & Chick, PC

(57) ABSTRACT

An image forming apparatus equipped with a processing apparatus which requires a warm-up operation of a predetermined time and performs a predetermined processing to an image-formed sheet includes: a control section to specify whether each of a plurality of input jobs is a first job requiring the processing by the processing apparatus or a second job performing no processing by the processing apparatus, and to determine an execution order of the jobs so that a plurality of first jobs are successively executed when the first jobs are input in addition to the second job; and an image forming section to sequentially execute the jobs in accordance with the execution order of the jobs which is determined by the control section.

10 Claims, 15 Drawing Sheets

FIG.9
A : JT2 : 3MIN
B : JT1 : 4MIN
C : JT2 : 20MIN
D : JT1 : 6MIN
A : JT2 : 3MIN
B : JT1 : 4MIN
D : JT1 : 6MIN
C : JT2 : 20MIN

IMAGE FORMING APPARATUS AND METHOD FOR CONTROLLING IMAGE FORMING APPARATUS

BACKGROUND

1. Field of the Invention

The present invention relates to an image forming apparatus and a method for controlling an image forming apparatus.

2. Description of Related Art

An image forming apparatus equipped with a processing apparatus which performs finishing such as bookbinding processing has conventionally been used.

As the image forming apparatus used for such purpose, a high-speed and high-performance image forming apparatus is generally used. Such apparatus can effectively be utilized not only for bookbinding processing, but other purposes needed in offices. Accordingly, two kinds of works, namely an image forming work performing bookbinding processing and an image forming work not performing bookbinding processing, are performed by using the image forming apparatus. In addition, the high-speed and high-performance image forming apparatus generally has a function to previously perform setting of a plurality of image forming work contents (called job setting) to execute the plurality of set jobs in order.

In such image forming apparatus some jobs need the processing by a processing apparatus which requires a warm-up operation in an image forming work. If the warm-up operation of the processing apparatus has not been completed when such job is executed, such job and all jobs to be executed after the job need to wait until the warm-up operation is completed. This is very inefficient.

For solving this problem, Japanese Patent Application Laid-Open Publication No. 2006-15683 describes a technique to improve an efficiency of an image forming apparatus by executing, among input jobs, a job (hereinafter referred to as a warm-up unrequiring job) not performing finishing which requires an warm-up operation in priority to a job (hereinafter referred to as a warm-up requiring job) performing finishing which requires the warm-up operation so that other jobs become executable even during the warm-up operation of an processing apparatus.

SUMMARY

However, the image forming apparatus described in Japanese Patent Application Laid-Open Publication No. 2006-15683 executes the jobs in accordance with the order of inputting after the warm-up operation of the processing apparatus is completed. Accordingly, in the case where the warm-up requiring job is firstly executed, the warm-up unrequiring job is secondly executed, and the warm-up requiring job is further executed, it becomes necessary to perform heating control to the processing apparatus even during execution of the warm-up unrequiring job in order to restrain reduction in temperature necessary for finishing. Thus, there is a problem that energy efficiency is lowered.

According to one aspect of the present invention, there is provided an image forming apparatus equipped with a processing apparatus which requires a warm-up operation of a predetermined time and performs a predetermined processing to an image-formed sheet, the apparatus including:

a control section to specify whether each of a plurality of input jobs is a first job requiring the processing by the processing apparatus or a second job performing no processing by the processing apparatus, and to determine an execution order of the jobs so that a plurality of first jobs are successively executed when the first jobs are input in addition to the second job; and an image forming section to sequentially execute the jobs in accordance with the execution order of the jobs which is determined by the control section.

Preferably, the control section specifies a warm-up completion time which is a time until the warm-up operation of the processing apparatus is completed, and a processing time for the input second job, the control section judges whether or not the processing time for the second job is within a range of the warm-up completion time, when the control section judges that the processing time for the second job is within the range of the warm-up completion time, the control section determines the job execution order so that the second job is executed in priority to the first jobs; and when the control section does not judge that the processing time for the second job is within the range of the warm-up completion time, the control section determines the job execution order so that the second job is executed consecutively to the first jobs which are successively executed.

Preferably, the control section determines the job execution order so that the first jobs have execution priorities when the warm-up operation of the processing apparatus is completed.

Preferably, the processing apparatus is a finishing device which applies an adhesive to the image-formed sheet, the processing apparatus including:

an adhesive accumulating section to accumulate the adhesive; and an accumulation quantity detecting section to detect an accumulation quantity of the adhesive accumulated in the adhesive accumulating section, wherein the control section makes the image forming section suspend an execution of the first jobs so that the second job has an execution priority when the accumulation quantity of the adhesive does not reach a predetermined quantity as a detection result by the accumulation quantity detecting section.

Preferably, the image forming apparatus further including:

an ejecting section to eject the sheet processed by the processing apparatus; and a sheet accumulating section to accumulate sheets ejected by the ejecting section, wherein the control section makes the image forming section suspend execution of the first jobs so that the second job has an execution priority when the sheets accumulated in the sheet accumulating section reach a predetermined quantity.

BRIEF DESCRIPTION OF THE DRAWINGS

The present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

In the following, the first embodiment of the present invention will be described with reference to the accompanying drawings. The scope of the invention is not limited to the shown examples.

Although the constituted apparatus is referred to as an image forming system as a whole in the embodiments of the present invention, the image forming apparatus of the present invention includes both of a configuration composed of an image forming apparatus body, and a configuration composed of the image forming apparatus body and other apparatuses.

Figure 1:
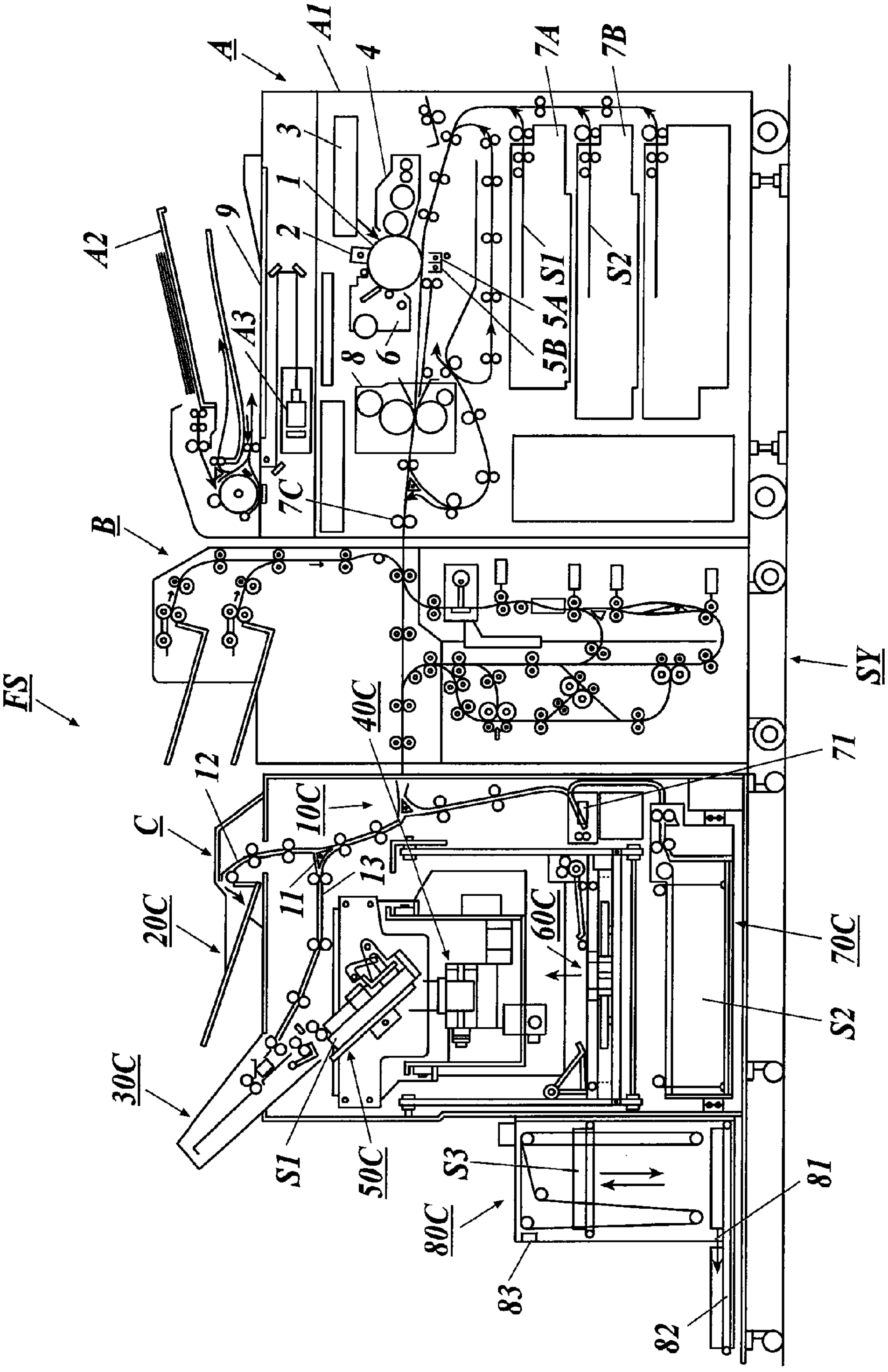
FIG. 1 is an overall configuration diagram of an image forming system.

An image forming system SY includes an image forming apparatus body A and a sheet processing apparatus FS as shown in FIG. 1, for example. The sheet processing apparatus FS is composed of a folding processing apparatus B and a bookbinding apparatus C.

The image forming apparatus body A has a function to form an image on each of sheets S1 or the like by the electrophotographic printing system, and includes an image forming section A1, a document conveying section A2, and an image reading section A3. In the image forming section A1, a charging section 2, an exposing section 3, a developing section 4, a transferring section 5A, a separating section 5B, and a cleaning section 6 are arranged around a drum-like photosensitive body 1. The respective processes of charging, exposing, developing, and transferring are executed to form a toner image on each of the sheets S1.

The sheets S1 to be covered with cover sheets S2 as a booklet is produced are housed in a feeding tray 7A, and the cover sheets S2 are housed in a feeding tray 7B and/or a cover sheet housing section 70C of the bookbinding apparatus C, for example.

The sheets S1 are ejected one by one from the feeding tray 7A or the like to be conveyed to the image forming section A1. The sheets S1 each including the toner image transferred thereon are subjected to fixing processing as passing through a fixing section 8. The fix-processed sheets S1 are ejected from sheet ejecting rollers 7C to the outside of the image forming apparatus body A.

Although the image forming apparatus body A of the present embodiment forms a monochrome image on a sheet by electrophotographic printing system, the image forming apparatus according to the present invention is not limited to the present embodiment, and may be a color image forming apparatus. Also the image forming system may be any image forming system other than the electrophotographic printing system.

The folding processing apparatus B includes a perforating section, a first folding processing section, a second folding processing section, and a third folding processing section, for example, to execute perforating processing to the image-formed sheets S1, various kinds of folding processing, and the like. The folding processing apparatus B also includes an inter-sheet inserting section to insert an inter-sheet into a booklet.

The bookbinding apparatus C produces a booklet by bundling the sheets S1 sent from the folding processing apparatus B to produce a sheet bundle, and by joining one of the cover sheets S2 to the bundle so that the sheet bundle is covered with one of the cover sheets S2 of U-shape.

Figure 2:
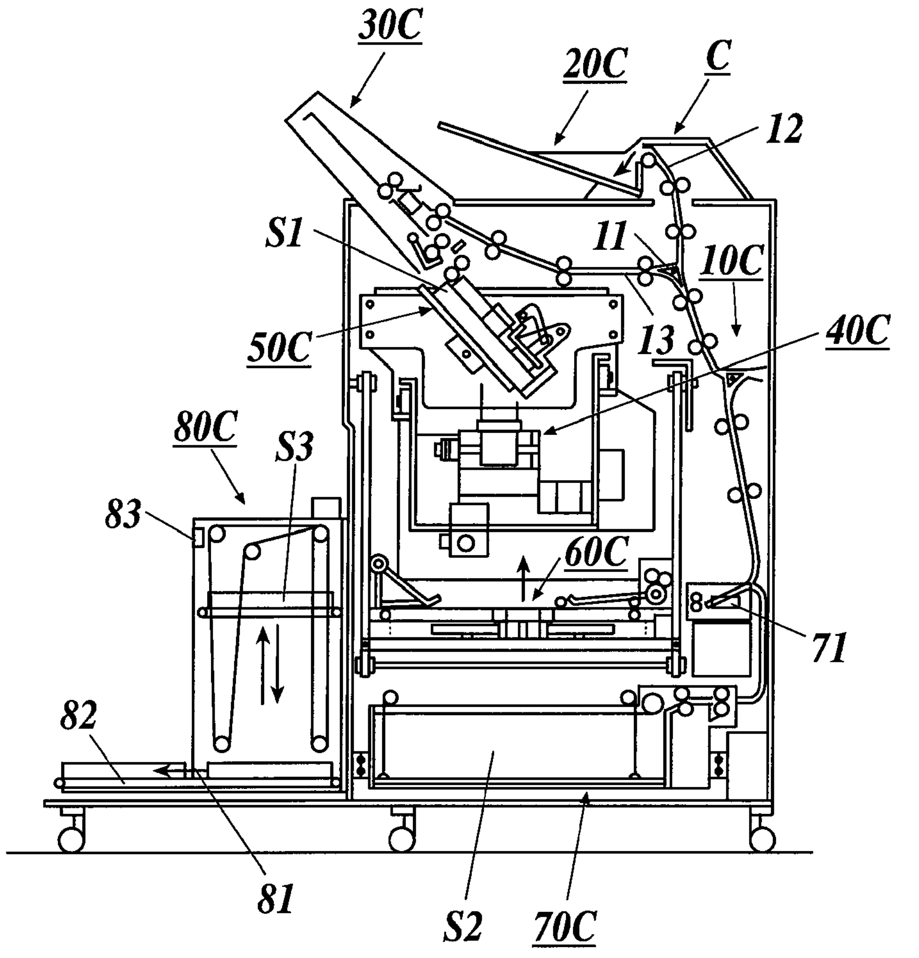
FIG. 2 is a configuration diagram of a bookbinding apparatus.

The bookbinding apparatus C includes a conveying section 10C, a sheet exit tray 20C, a sheet reversing section 30C, an applying section 40C as a processing apparatus, a collecting section 50C, a joining section 60C (booklet producing section) to join a cover sheet to a sheet bundle, a cover sheet housing section 70C, and a book ejecting section 80C as shown in FIG. 2, for example. The sheets S1 conveyed to the bookbinding apparatus C are ejected to the sheet exit tray 20C through an ejecting path 12 or are conveyed to the sheet reversing section 30C, with a switching gate 11 provided in the conveying section 10C. The sheets S1 in the case of not being bound in the bookbinding apparatus C, and the sheets subjected to folding processing in the folding processing apparatus B, are ejected to the sheet exit tray 20C. In the bookbinding apparatus C, the sheets S1 are conveyed to the sheet reversing section 30C through a conveying path 13, and after being switchbacked in the sheet reversing section 30C, the sheets S1 are conveyed to the collecting section 50C. A set number of the sheets S1 are collected in the collecting section 50C, and when the number of the sheets S1 reaches the set number, the collecting section 50C rotates so as to hold the bundle of the sheets S1 in a substantially vertical state. Then, the applying section 40C applies an adhesive to a lower surface, namely a back part of the bundle of the sheets S1, and one of the cover sheets S2 contacts the bundle of the sheets S1 to be adhered thereto. Booklets S3 produced by adhering the cover sheets S2 to bundles of the sheets S1 are ejected to the book ejecting section 80C. The book ejecting section 80C is equipped with an accumulating section 82 to accumulate the booklets S3, an ejecting section 81 to eject the booklets S3 to the accumulating section 82, and a sheet accumulation detecting section 83 to detect that the booklets S3 are accumulated up to a predetermined height. The book ejecting section 80C changes a position in the ejecting section 81 to which the booklets S3 are ejected according to a quantity of the booklets S3 accumulated in the accumulating section 82. When the sheet accumulation detecting section 83 detects that the booklets S3 are accumulated up to the predetermined height, an execution of job which performs after-mentioned bookbinding processing is suspended. The cover sheets S2 are housed also in the cover sheet housing section 70C, in addition to the feeding tray 7B. When the cover sheets S2 are to be image-formed, the cover sheets S2 are ejected from the feeding tray 7B. When the cover sheets S2 are not to be image-formed, the cover sheets S2 are ejected from the cover sheet housing section 70C. If the cover sheets S2 have long unstandardized sizes, the cover sheets S2 are cut to be predetermined lengths with a cutter 71 on the basis of size information of the sheets S1 and thickness information of the bundle of the sheets S1.

Next, a step of applying the adhesive to the bundle of the sheets S1 will be described with reference to FIGS. 3A-3D.

A second nipping member 503 moves toward the bundle of the sheets S1 by a motor M1, and presses the bundle of the sheets S1 with a certain pressure. At that time, a drive torque detecting sensor detects an increase of a drive torque of the motor M1, and movement of the second nipping member 503 is stopped. By such configuration, the bundle of the sheets S1 is firmly nipped by a first nipping member 502 and the second nipping member 503. A movement quantity of the second nipping member 503 is measured by an encoder 509 and is stored in a random access memory (RAM) or the like.

Figure 3A:
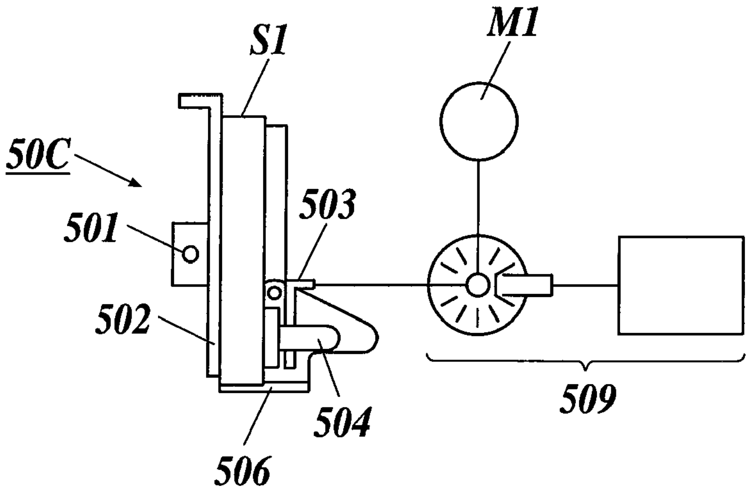
FIG. 3A is a diagram showing a step of applying an adhesive to a sheet bundle.
Figure 3B:
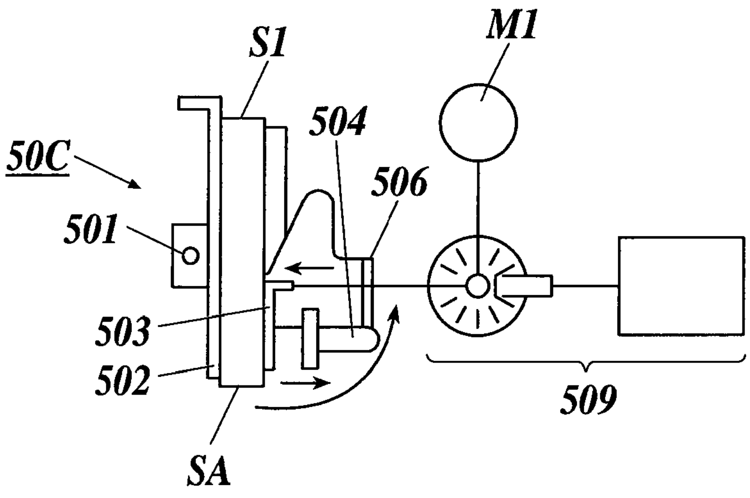
FIG. 3B is a diagram showing a step of applying the adhesive to the bundle of the sheets.
Figure 3C:
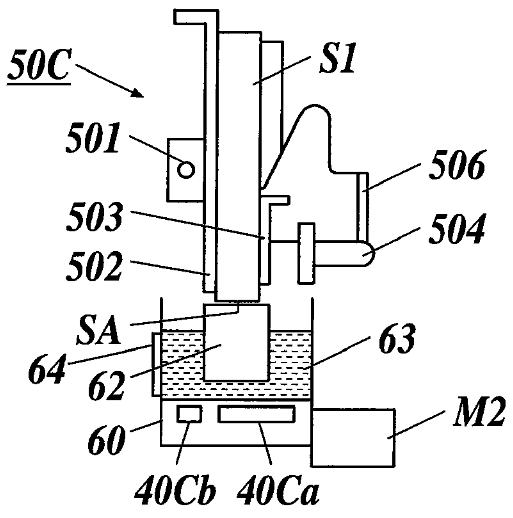
FIG. 3C is a diagram showing a step of applying the adhesive to the bundle of the sheets.

At the stage where the bundle of the sheets S1 is nipped by the first nipping member 502 and the second nipping member 503, a supporting plate 506 rotates by 90 degrees to a retract position as shown in FIG. 3B. At the stage where the supporting plate 506 is in the retract position, a lower surface SA of the bundle of the sheets S1 and an applying roller 62 are not in contact with each other (see FIG. 3C).

Figure 3D:
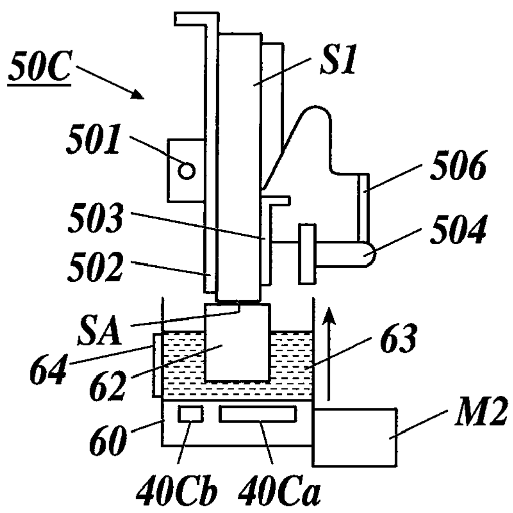
FIG. 3D is a diagram showing a step of applying the adhesive to the bundle of the sheets.

Next, as shown in FIG. 3D, when the applying section 40C housing an adhesive 63 rises so that the applying roller 62 contacts the lower surface SA, namely the back part of the bundle of the sheets S1, and when the applying section 40C moves along the lower surface SA of the bundle of the sheets S1, the adhesive 63 is applied to the lower surface SA of the bundle of the sheets S1. The applying roller 62 is driven by a motor M2.

The adhesive 63 to be used in the embodiments of the present invention is aqueous emulsion paste such as vinyl acetate resin, which has a viscosity of 750 to 1500 mPa·s at normal temperature, for example. The sheets S1 adhered with the water soluble adhesive 63 can be reused as recycled paper.

The applying section 40C is equipped with a heating section 40Ca and a temperature detecting section 40Cb, by which the adhesive 63 is heated up to a predetermined temperature to have a certain viscosity and housing temperature is controlled so that the adhesive 63 maintains the viscosity. The applying section 40C is equipped with an adhesive accumulating section 60 to accumulate the adhesive 63 and an accumulation quantity detecting section 64. As the accumulation quantity detecting section 64, a level sensor or the like can be applied, for example, to detect a quantity of the adhesive accumulated in the adhesive accumulating section 60. The adhesive accumulating section 60 is configured to make the adhesive 63 appropriately supplied from a supply tank (not shown) depending on a detection result of the accumulation quantity detecting section 64. When the accumulation quantity detecting section 64 detects that the quantity of the adhesive 63 accumulated in the adhesive accumulating section 60 falls below a predetermined quantity, an execution of the job which performs after-mentioned bookbinding processing is suspended.

The time till the temperature of the adhesive 63 reaches a certain temperature so that the adhesive 63 becomes usable for producing the booklets S3 is a rate-determining time for the warm-up operation of the bookbinding apparatus C. The warm-up operation time (for example, 15 minutes to 20 minutes) is longer in comparison with the warm-up time (for example, 5 minutes) of the image forming apparatus body A.

Therefore, for example, when a plurality of jobs are set, and if the firstly-set job is the above described job performing the bookbinding processing, then the job not performing the bookbinding processing is set, and after that the job performing the bookbinding processing is further set, in order to reduce a job waiting time occurring owing to the warm-up operation to streamline works, it is necessary to continuously heat the heating section 40Ca even during execution of the job not performing the bookbinding processing to maintain the adhesive 63 in a constant temperature. This situation is a significant problem from a point of view of energy efficiency of the image forming system SY. There is also a problem that if overheating is performed, the adhesive 63 deteriorates, the adhesive force thereof decreases and/or an offensive smell is generated so that the quality of the booklet is lowered.

Next, an image forming apparatus which solves such problems and a method for controlling the image forming apparatus will be described.

Figure 4:
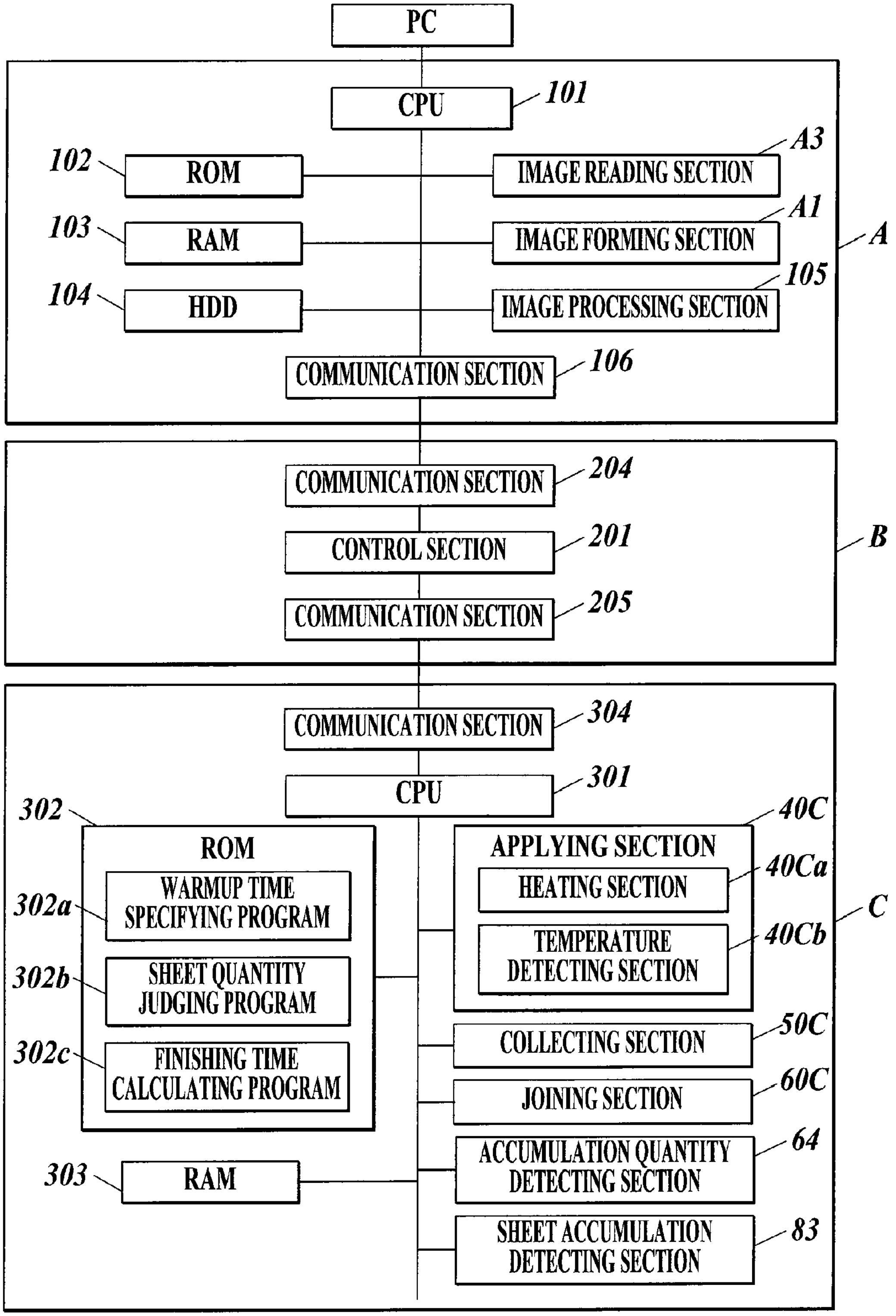
FIG. 4 is a control block diagram of the image forming system.

As shown in FIG. 4 for example, the image forming apparatus body A, the folding processing apparatus B, and the bookbinding apparatus C are electrically connected to each other through communication sections 106, 204, 205, and 304, and control signals are mutually transmitted and received. The image forming apparatus body A is electrically connected to a personal computer (PC).

A central processing unit (CPU) 101 which functions as a control section controls an operation of the whole image forming apparatus body A, and is connected to a read only memory (ROM) 102, a random access memory (RAM) 103, a hard disc drive (HDD) 104, and the like. The CPU 101 reads out after-mentioned various control programs stored in the ROM 102 to expand the read-out control programs in the RAM 103, and controls operations of the respective sections including the image forming section A1, the image reading section A3, and an image processing section 105. The CPU 101 also executes various processing in accordance with the program expanded in the RAM 103 and stores processing results in the RAM 103. Then, the CPU 101 stores the processing results which are stored in the RAM 103 into a predetermined storage. The HDD 104 stores various pieces of data so that the data can be appropriately read or written.

A control section 201 of the folding processing apparatus B controls an operation of the whole folding processing apparatus B, and controls operations of the perforating section and the first folding processing section, which are not shown.

A CPU 301 of the bookbinding apparatus C controls an operation of the whole bookbinding apparatus C, and is connected to a ROM 302, a RAM 303, and the like. The CPU 301 reads out various control programs stored in the ROM 302 to expand the read-out programs in the RAM 303, and reads signals output from the accumulation quantity detecting section 64 and/or the sheet accumulation detecting section 83 to control operations of the applying section 40C, the collecting section 50C, the joining section 60C, and the like. The CPU 301 also executes various processing in accordance with the programs expanded in the RAM 303 and stores processing results in the RAM 303. Then, the CPU 301 stores the processing results which are stored in the RAM 303 in a predetermined storage.

In the present embodiment, when the accumulation quantity detecting section 64 detects that the quantity of the adhesive 63 accumulated in the adhesive accumulating section 60 falls below the predetermined quantity, the CPU 301 outputs information indicating the detection result to the image forming apparatus body A.

When the temperature indicated by the temperature detecting section 40Cb becomes a predetermined temperature, the CPU 301 outputs information indicating the completion of the warm-up operation to the image forming apparatus body A.

The ROM 302 stores a warm-up operation time specifying program 302*a*, a sheet quantity judging program 302*b*, a finishing time calculating program 302*c*, and the like.

The warm-up operation time specifying program 302*a* is a program for specifying a warm-up completion time which is a time until a warm-up operation of the applying section 40C as a processing apparatus is completed. To put it more concretely, the warm-up operation time specifying program 302*a* is a program for specifying a time (warm-up completion time) necessary for making the adhesive 63 reach a certain temperature from the temperature indicated by the temperature detecting section 40Cb to transmit the specified information to the image forming apparatus body A when receiving an instruction requesting the warm-up completion time information from the image forming apparatus body A. The method for specifying the time necessary for making the adhesive 63 reach the certain temperature from the temperature indicated by the temperature detecting section 40Cb is performed, for example, by referring to a predetermined table and reading out a time corresponding to a difference between the detected temperature and an aimed temperature. The method may be performed also by calculating the time by multiplying the temperature indicated by the temperature detecting section 40Cb by a predetermined coefficient. It is also possible to calculate the time by multiplying a predetermined time calculating formula by a surrounding temperature coefficient may be adopted.

The sheet quantity judging program 302*b* is a program for judging whether or not the booklets S3, which is a bundle of the sheets accumulated in the accumulating section 82, is loaded up to a predetermined height (or becomes a predetermined quantity) on the basis of a detection signal from the sheet accumulation detecting section 83. In other words, the sheet quantity judging program 302*b* is a program for judging whether or not the sheets accumulated in the sheet accumulating section 82 becomes the predetermined quantity. When it is judged that the booklets S3 are accumulated up to the predetermined height in the accumulating section 82 by executing the program 302*b*, the CPU 301 transmits information indicating the judgment result to the image forming apparatus body A.

The finishing time calculating program 302*c* is a program for calculating a processing time necessary for performing a certain work on the basis of processing times of the applying section 40C, the collecting section 50C, the joining section 60C, and the like. To put it more concretely, the finishing time calculating program 302*c* is a program for calculating a processing time in the bookbinding apparatus C to transmit information regarding the calculation to the image forming apparatus body A when receiving an instruction to request the information indicating the processing time in the bookbinding apparatus C at the time of executing a certain job from the image forming apparatus body A. The processing time is, in the case of performing the aforesaid bookbinding processing, a time necessary for producing each of booklets S3 for example.

Next, the control programs stored in the ROM 102 of the image forming apparatus body A will be described.

Figure 5:
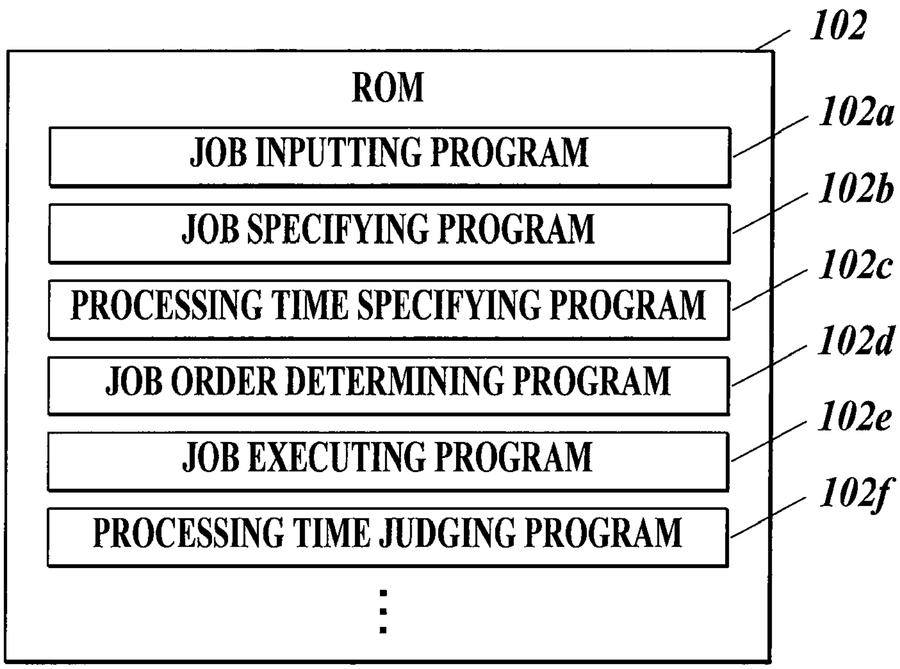
FIG. 5 is a diagram showing programs stored in a read only memory (ROM) in the image forming apparatus.

As shown in FIG. 5 for example, the ROM 102 stores various control programs such as a job inputting program 102*a*, a job specifying program 102*b*, a processing time specifying program 102*c*, a job order determining program 102*d*, a job executing program 102*e*, and a processing time judging program 102*f*.

The job inputting program 102*a* is a program for receiving a plurality of jobs to store contents of the input jobs in the RAM 103 of the image forming apparatus body A for example, when an operator or the like inputs the plurality of jobs with an operation section (not shown) provided in a PC (see FIG. 4) or the image forming apparatus body A. In other words, the job inputting program 102*a* is a program for inputting a plurality of jobs according to a predetermined input operation by an operator.

The job specifying program 102*b* is a program for specifying whether the job is a job (a first job or a job of job type 1) requiring applying processing by the applying section 40C, such as the aforesaid bookbinding processing, or a job (a second job or a job of job type 2) unrequiring applying processing by the applying section 40C, such as straight paper ejection, on the basis of input contents of the jobs stored in the RAM 103 as the CPU 101 executes the job inputting program 102*a*. In other words, the job specifying program 102*b* is a program for specifying whether the input job is the first job requiring the processing by the processing apparatus or the second job which does not perform processing by the processing apparatus.

The processing time specifying program 102*c* is a program for calculating an expected processing time necessary from an execution start of the job unrequiring applying processing to a completion of the job, for each of the jobs. In other words, the processing time specifying program 102*c* is a program for specifying the processing time for the second job. The expected processing time of the job unrequiring applying processing is calculated in accordance with a predetermined algorithm on the basis of, for example, the information indicating the processing time in the bookbinding apparatus C which is transmitted from the CPU 301 of the bookbinding apparatus C, the number of printing sheets, a paper size, and processing contents. The method for specifying the expected processing time is not limited to the above-described calculation, but the method of using a table configured so that a previously determined time is read out correspondingly to the job content to specify the expected processing time on the basis of the table may be adopted, for example.

The job order determining program 102*d* is a program for allowing the CPU 101 to determine a job execution order stored in the RAM 103 so that when the plurality of first jobs are input by the job inputting program 102*a*, the first jobs are successively executed, though the details of the job order determining program 102*d* will be described below. In other words, the job order determining program 102*d* is a program for determining the execution order of a plurality of jobs so that the first jobs are successively executed even when the first jobs are input with the second job intermixed. The job order determining program 102*d* is also a program for determining the job execution order so that the second jobs are executed in priority to the first jobs when the processing time for the second job is within a range of a warm-up completion time after the CPU 101 executes the after-mentioned processing time judging program 102*f* to judge whether or not the processing time for the second job is within the range of the warm-up completion time, and for determining the job execution order so that the second jobs are executed subsequently to the successive execution of the first jobs when the processing time for the second job is not within a range of a warm-up completion time. Furthermore, the job order determining program 102*d* is also a program for determining the job execution order so that the first jobs are executed in priority to the second jobs when the warm-up operation of the applying section 40C is completed.

The job executing program 102*e* is a program for making the image forming section A1 execute the jobs in accordance with the order determined when the CPU 101 executes the job order determining program 102*d*.

The processing time judging program 102*f* is a program for comparing the warm-up completion time information transmitted from the CPU 301 of the bookbinding apparatus C with the expected processing time for the second job which is calculated when the CPU 101 executes the processing time specifying program 102*c* to judge whether or nor the processing time for the second job is within the range of the warm-up completion time. To put it more concretely, the processing time judging program 102*f* is a program for subtracting the processing time for the second job from the warm-up completion time when there is the second job for which the execution order has been already determined so that the second job takes priority over the first jobs, and for comparing the time obtained by the operation of subtraction with the processing time for the second job which is a comparison target at this time.

Next, a job order determining processing in the image forming system SY configured as described above will be described with reference to FIGS. 6-8.

Figure 6:
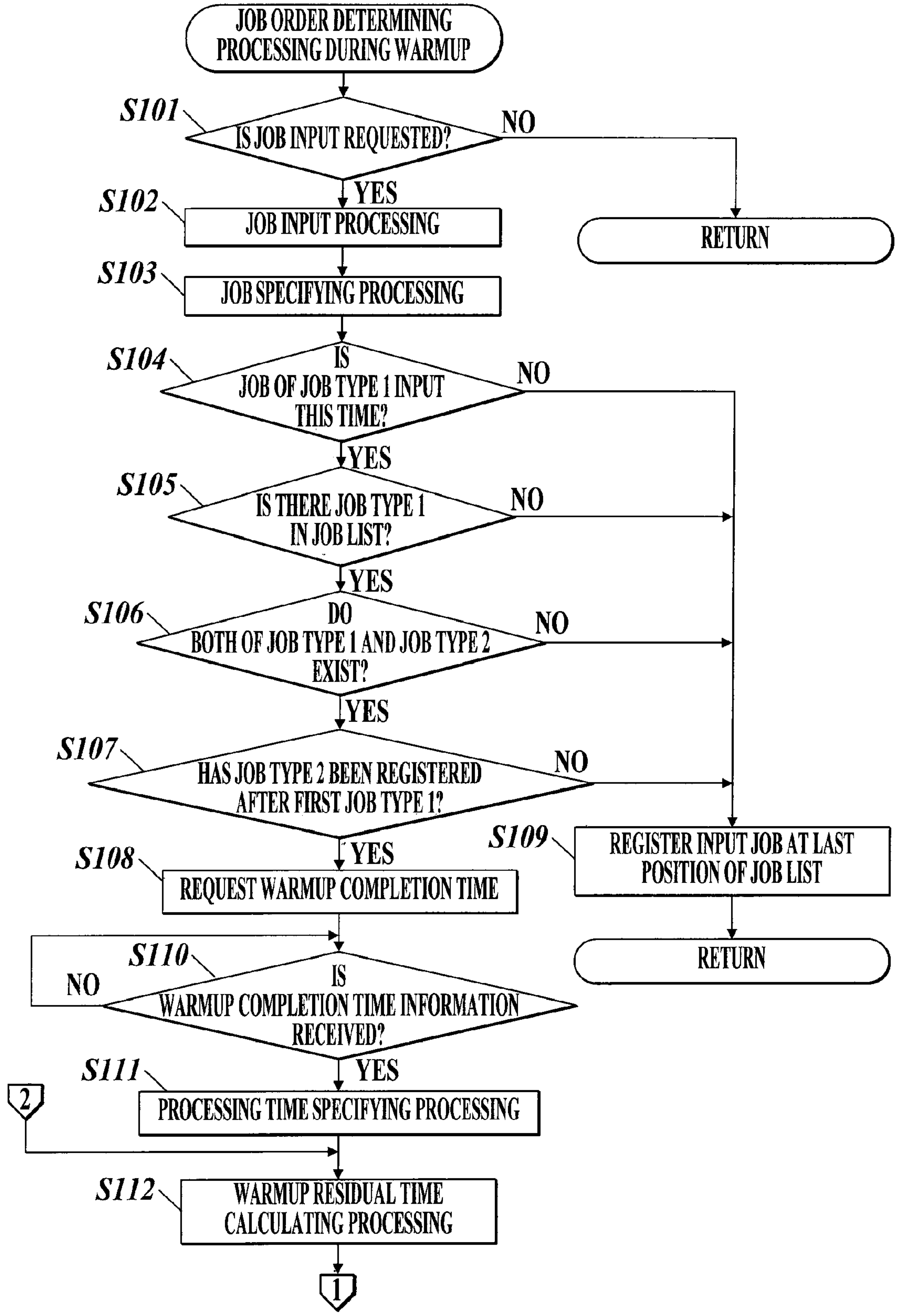
FIG. 6 is a flow chart showing a procedure for determining a job execution order.

First, the job order determining processing during the warm-up operation will be described with reference to FIGS. 6 and 7.

When the job order determining program 102*d* is read out during the warm-up operation and the job order determining processing during the warm-up operation is executed, the CPU 101 firstly judges whether or not the job input is requested by the operation section in the PC or the image forming apparatus body A (Step S101). When the CPU 101 judges that the job input is requested (Step S101: Y), the CPU 101 executes the job input processing by reading out the job inputting program 102*a* (Step S102). When the CPU 101 does not judge that the job input is requested (Step S101: N), the processing ends.

The CPU 101 performs inputting by storing the job contents which are desired by an operator into the RAM 103 in accordance with the input operation of the operator in the job input processing.

Next, the CPU 101 reads out the job specifying program 102*b* to execute the job specifying processing (Step S103). The CPU 101 specifies whether the job input at Step S102 is the job of job type 1 requiring the applying processing by the applying section 40C, or the job of job type 2 performing no applying processing by the applying section 40C, in the job specifying processing.

Next, the CPU 101 judges whether or not the presently input job is the job of job type 1 (Step S104).

When the CPU 101 judges that the presently input job is job type 1 (Step S104: Y), the processing shifts to Step S105. On the other hand, when the CPU 101 does not judge that the presently input job is job type 1, namely the CPU 101 judges that the input job is job type 2 (Step S104: N), the CPU 101 registers the presently input job at a last position of a job list provided in a predetermined storage region of the RAM 103 (Step S109), and ends this processing.

The CPU 101 judges whether or not the job of job type 1 is registered among the jobs stored in the job list in Step S105 (Step S105).

When the CPU 101 judges that the job of job type 1 is registered among the jobs resisted in the job list (Step S105: Y), the processing shifts to Step S106. On the other hand, when the CPU 101 does not judge that the job of job type 1 is registered in the job list (Step S105: N), the CPU 101 ends this processing after the execution of the aforesaid processing of Step S109.

The CPU 101 judges whether or not both of the job of job type 1 and the job of job type 2 exist among the jobs registered in the job list, in Step 106 (Step S106).

When the CPU 101 judges that both of the job of job type 1 and the job of job type 2 exist (Step S106: Y), the processing shifts to Step S107. On the other hand, when the CPU 101 does not judge that both of the job of job type 1 and the job of job type 2 exist, in other words, when only the jobs of job type 1 are registered in the job list (Step S106: N), the CPU 101 ends this processing after the execution of the aforesaid processing of Step S109.

The CPU 101 judges whether or not the job of job type 2 is registered behind the job of job type 1 which has been registered first among the jobs of job type 1 in the job list, in Step S107 (Step S107).

When the CPU 101 judges that the job of job type 2 is registered behind the firstly-registered job of job type 1 (Step S107: Y), the CPU 101 transmits instruction information for requesting the warm-up completion time information of the bookbinding apparatus C (Step S108), and then executes the processing of Step 110. On the other hand, when the CPU 101 does not judge that the job of job type 2 is registered behind the firstly-registered job of job type 1, namely the CPU 101 judges that no job of job type 2 is registered behind the firstly-registered job of job type 1 (Step S107: N), the CPU 101 ends this processing after the execution of the aforesaid processing of Step S109.

Then, the CPU 101 judges whether or not the CPU 101 receives the warm-up completion time information from the bookbinding apparatus C after transmitting the instruction information in Step S110 (Step S110), and repeatedly executes this processing until the CPU 101 receives the warm-up completion time information.

Next, the CPU 101 reads out the processing time specifying program 102*c* to execute processing time specifying processing (Step S111). In the processing time specifying processing, the CPU 101 calculates the processing time for the job of job type 2 (target job type 2) which is registered at a position immediately behind the job of job type 1 (the first job of job type 1) registered first in the job list. To put it concretely, the CPU 101 transmits the instruction information for requesting the information indicating the processing time necessary for executing the target job of job type 2 to the bookbinding apparatus C. The CPU 101 also transmits the similar instruction information to the control section 201 of the folding processing apparatus B. Then, when the CPU 101 receives the information indicating the processing time from the folding processing apparatus B and the bookbinding apparatus C, the CPU 101 calculates the expected processing time for the job on the basis of the various parameters such as the number of sheets and a paper size.

Next, the CPU 101 executes warm-up residual time calculating processing (Step S112). In the warm-up residual time calculating processing, the CPU 101 calculates a time (Twup) obtained by subtracting the total expected processing time for the after-mentioned jobs of job type 2 which are registered in priority to the jobs of job type 1 from the warm-up completion time. For example, if the warm-up completion time is 15 minutes; the number of jobs of job type 2 registered in priority to the jobs of job type 1 is two; and the respective expected processing times are 3 minutes and 5 minutes, then the warm-up operation residual time (Twup) becomes 7 minutes.

Figure 7:
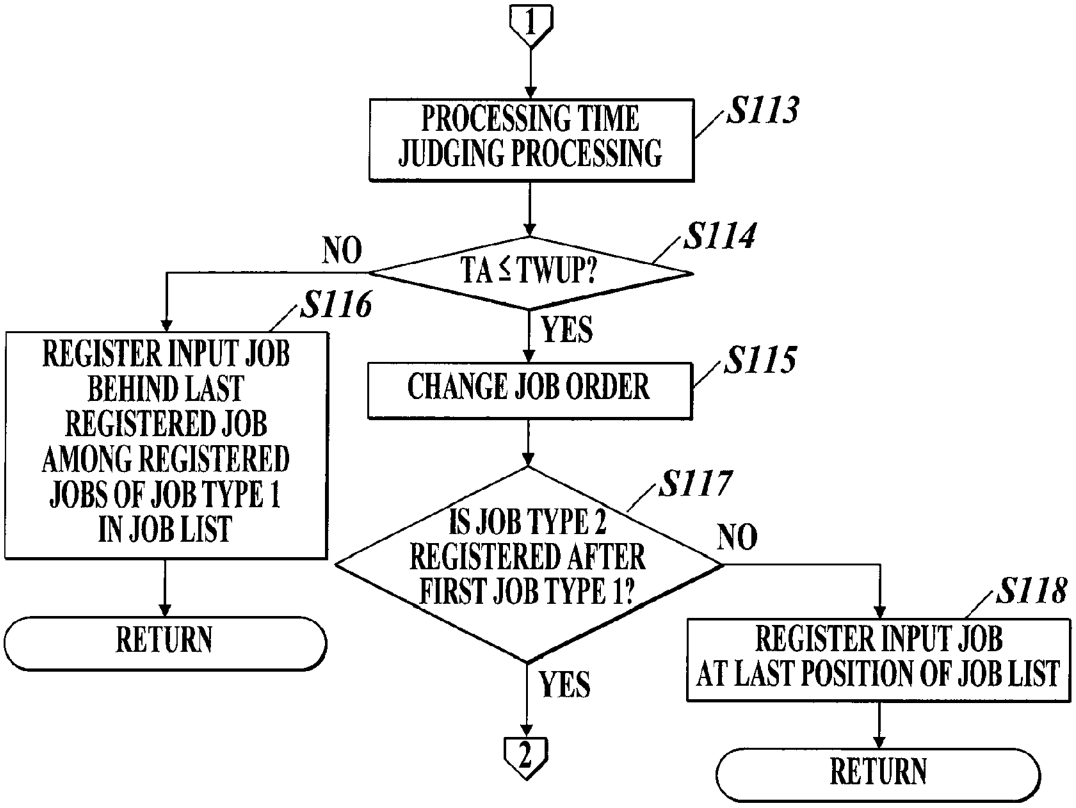
FIG. 7 is a flow chart showing the procedure for determining the job execution order.

Next, as shown in FIG. 7, the CPU 101 reads out the processing time judging program 102*f* to execute processing time judging processing (Step S113). In the processing time judging processing, the CPU 101 compares the processing time (Ta) for the target job of job type 2 and the warm-up operation residual time (Twup).

Next, the CPU 101 judges whether or not the processing time (Ta) for the target job of job type 2 is equal to or less than the warm-up operation residual time (Twup) as the result of the comparison in the processing time judging processing (Step S114).

When the CPU 101 judges that the processing time (Ta) for the target job of job type 2 is equal to or less than the warm-up operation residual time (Twup) (Step S114: Y), the CPU 101 performs the processing of changing the register positions of jobs in the job list so that the register position of the target job of job type 2 is in front of the register position of the first job of job type 1 (Step S115). On the other hand, when the CPU 101 does not judge that the processing time (Ta) for the target job of job type 2 is equal to or less than the warm-up operation residual time (Twup), namely if the CPU 101 judges that the processing time (Ta) for the target job of job type 2 is longer than the warm-up operation residual time (Twup) (Step S114: N), the CPU 101 registers the presently input job of job type 1 consecutively behind the job registered at the last position of the registered jobs of job type 1 in the job list (Step S116), and ends this processing.

The CPU 101 judges whether or not the job of job type 2 is registered behind the first job of job type 1, in Step S117 (Step S117).

When the CPU 101 judges that the job of job type 2 is registered behind the first job of job type 1 (Step S117: Y), the CPU 101 does not register the presently input job here, and again shifts to the processing of Step S112. On the other hand, when the CPU 101 does not judge that the job of job type 2 is registered behind the first job of job type 1, namely when the CPU 101 judges that only the jobs of job type 1 are registered behind the first job of job type 1 (Step S117: N), the CPU 101 registers the presently input job at the last position of the job list (Step S118), and ends this processing.

Figure 8:
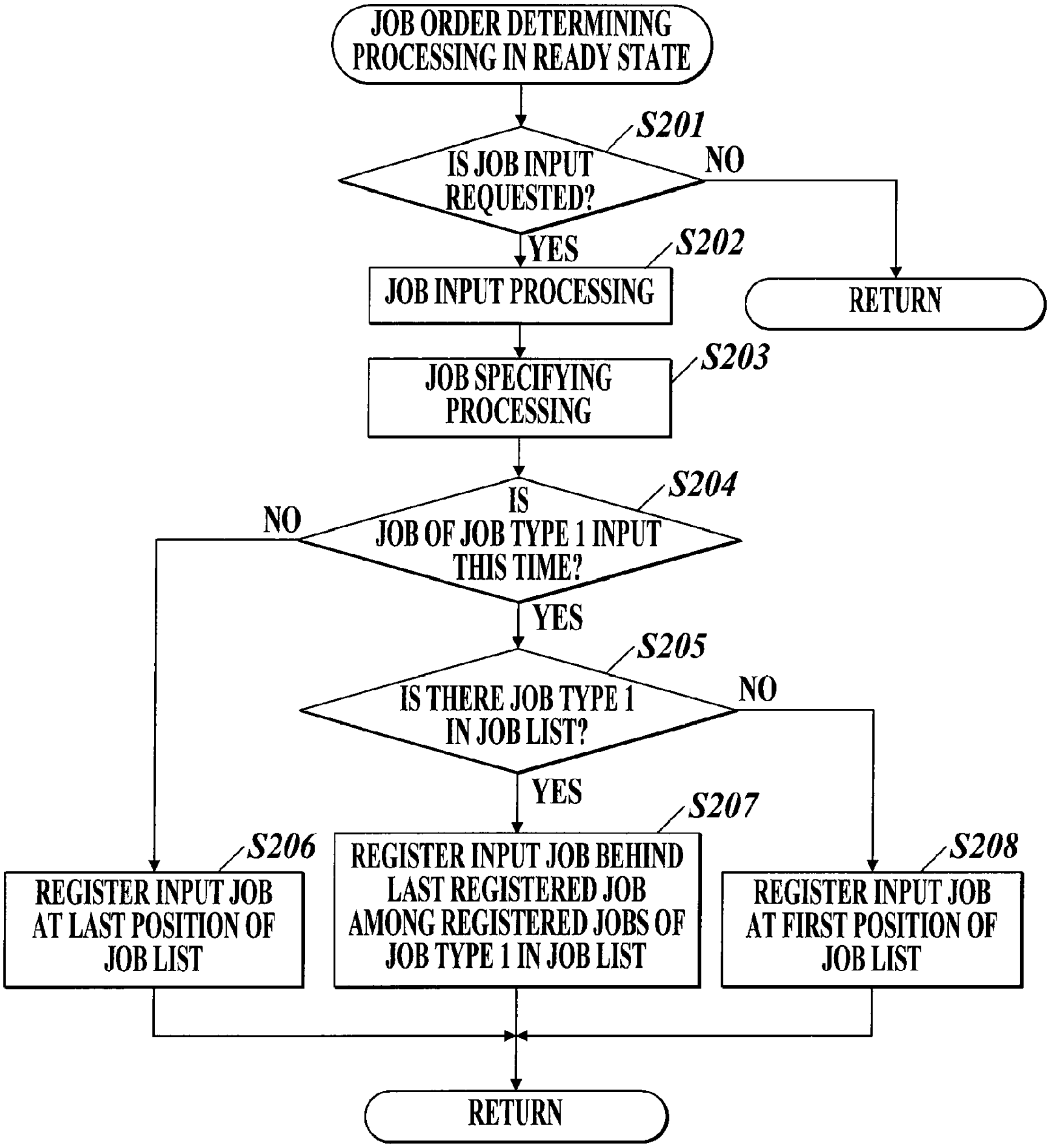
FIG. 8 is a flow chart showing the procedure for determining the job execution order.

Next, the job order determining processing in a ready state will be described with reference to FIG. 8.

When the job order determining program 102*d* is read out in the ready state, namely at the time of completion of the warm-up operation, to execute the job order determining processing in the ready state, the CPU 101 firstly judges whether or not the job input is requested by the operation section of the PC or the image forming apparatus body A (Step S201). When the CPU 101 judges that the job input is requested (Step S201: Y), the CPU 101 reads out the job inputting program 102*a* to execute the job input processing (Step S202). When the CPU 101 does not judge that the job input is requested (Step S201: N), this processing ends.

The CPU 101 performs inputting by storing the job contents desired by an operator into the RAM 103 in accordance with the input operation by the operator in the job input processing.

Next, the CPU 101 reads out the job specifying program 102*b* to execute the job specifying processing (Step S203). The CPU 101 specifies whether the job input at Step S202 is the job of job type 1 requiring the aforesaid applying processing by the applying section 40C, or the job of the job type 2 unrequiring applying processing by the applying section 40C, in the job specifying processing.

Next, the CPU 101 judges whether or not the presently input job is job type 1 (Step S204).

When the CPU 101 judges that the presently input job is job type 1 (Step S204: Y), the processing shifts to that at Step S205. On the other hand, when the CPU 101 does not judge that the presently input job is job type 1, namely when the presently input job is job type 2 (Step S204: N), the CPU 101 registers the presently input job at the last position in the job list, provided in the predetermined storage region of the RAM 103 (Step S206), and ends this processing.

The CPU 101 judges whether or not the job of job type 1 is registered among the jobs registered in the job list, in Step S205 (Step S205).

When the CPU 101 judges that the job of job type 1 is registered among the jobs registered in the job list (Step S205: Y), the CPU 101 registers the presently input job of job type 1 consecutively behind the last-registered job among the already-registered jobs of job type 1 in the job list (Step S207), and ends this processing. On the other hand, when the CPU 101 does not judge that the job of job type 1 is registered among the jobs registered in the job list (Step S105: N), the CPU 101 registers the presently input job of job type 1 at the first position of the job list, and if the job of job type 2 has been registered, the CPU 101 slides the register position of the job of job type 2 rearward (Step S208), and ends this processing.

After the job is registered by the aforesaid processing, the CPU 101 reads out the job executing program 102*e* to execute job executing processing, and thereby sequentially executes the jobs registered to the image forming section A1.

In addition, when the information indicating that the accumulation quantity detecting section 64 detects that the quantity of the adhesive 63 accumulated in the adhesive accumulating section 60 falls below a predetermined quantity or the information indicating that the sheet accumulation detecting section 83 detects that the booklets S3 are loaded up to a predetermined height is output from the bookbinding apparatus C during the execution of a job, the CPU 101 controls the image forming section A1 so that the execution of the job of job type 1 is temporarily suspend, and that if the job of job type 2 has been registered in the job list, this job is executed in priority to the job of job type 1.

By the above processing, even when both of the jobs of job type 1 requiring the processing by a processing apparatus which requires the warm-up operation and the job of job type 2 unrequiring the processing by the processing apparatus which requires the warm-up operation exist, the jobs of job type 1 can be successively executed. Accordingly, no job of job type 2 intervenes between the jobs of job type 1. Hence, it becomes unnecessary to heat the heating section 40Ca for maintaining the temperature in the applying section 40C even during the execution of the jobs of job type 2, and thereby the energy efficiency of the applying section 40C can be enhanced. Furthermore, since the adhesive 63 is not excessively heated, deterioration of the adhesive 63 is suppressed, and the product qualities of the booklets S3 can be maintained.

How the job order is determined when an operator inputs jobs into the image forming system SY configured as described above will be described with reference to FIGS. 9-14.

First, the job registration (a way of determining the job order) in the case where the jobs are input during the warm-up operation will be described.

Figure 9:
FIG. 9 is a diagram for explaining about the procedure for determining the job execution order.

As shown in an upper half part of the list of FIG. 9, an operator sequentially inputs jobs a-c (job A: job type 2, 3 minutes of processing time, job B: job type 1, 4 minutes of processing time, job C: job type 2, 20 minutes of processing time). Since the job A is job type 2 (Step S104 in FIG. 6), no job of job type 1 is registered in the job list at the time of inputting the job B (Step S105 in FIG. 6), and the job C is job type 2 (Step S104 in FIG. 6), the registration order of the job list is not changed, and the jobs a-c are registered in the job list in the order of inputting (Step S109 in FIG. 6).

Next, when a job D (job D: job type 1, 6 minutes of processing time) is input, since the job of the job type 1 is registered in the job list at the time of inputting the job D (Step S105 in FIG. 6), since both of the job of the job type 1 and the jobs of the job type 2 exist (Step S106 in FIG. 6), and since the job C of job type 2 is registered behind the job b which is the first job of job type 1 (Step S107 in FIG. 6), the warm-up operation residual time is calculated after the warm-up completion time information is obtained from the bookbinding apparatus C. Because the job A of job type 2 is registered in front of the first job of job type 1, the residual warm-up operation time is 2 minutes if the obtained warm-up completion time is supposed to be 5 minutes. Because the processing time for the job C is longer than the warm-up operation residual time (Step S114 in FIG. 7), the job C is not arranged in front of the job B, and as shown in a lower half part of the list of FIG. 9, the presently input job D is arranged at the position immediately behind the job B, and the job C is slid rearward (Step S116 in FIG. 7).

The relations between the processing times for the registered jobs of the example shown in FIG. 9 and the heating times of the heating section 40Ca will be described with reference to FIG. 10.

Figure 10:
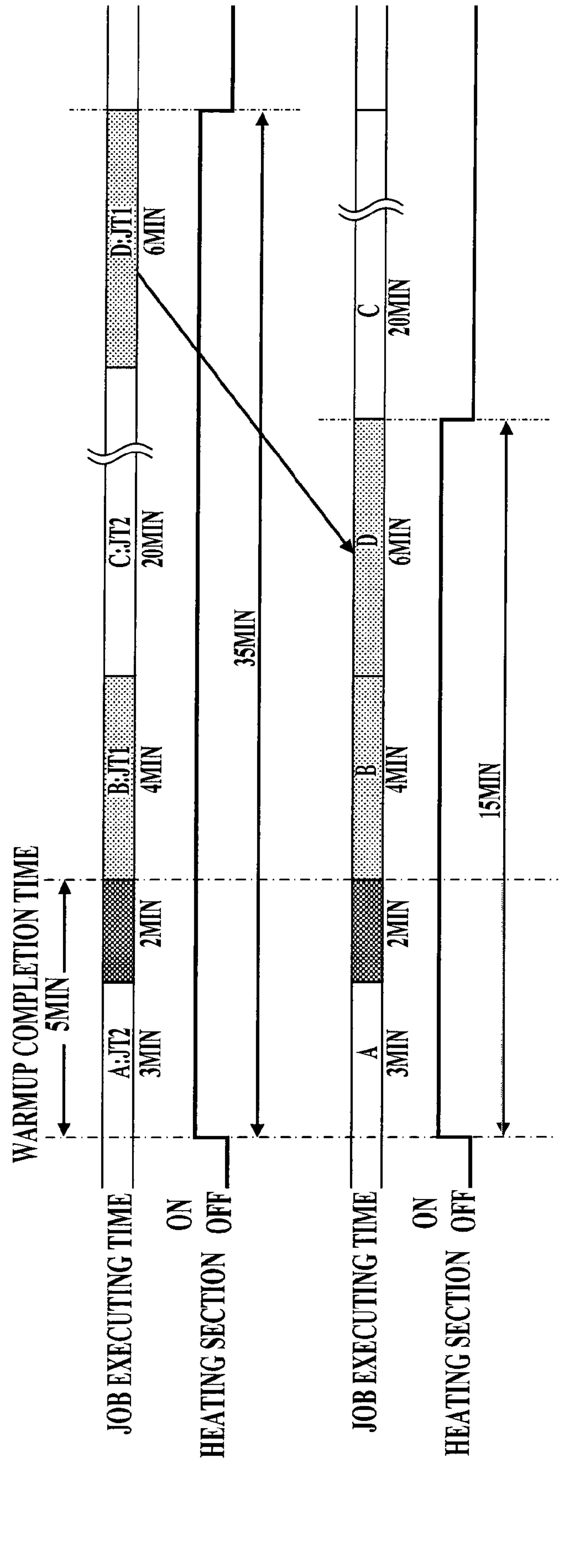
FIG. 10 is a diagram for explaining a relation between determination of the job execution order and each heating time.

As shown in an upper half part of the list of FIG. 10, in the case where the job order is not changed and the jobs are performed in accordance with the order of inputting, after the execution of the job A, the execution of the job B of job type 1 is suspended until the completion of the warm-up operation, and thereby a waiting time of 2 minutes is produced. After that, if the jobs b-d are sequentially performed, the heating section 40Ca of the applying section 40C would continue heating for 35 minutes.

On the other hand, according to the embodiment of the present invention, as shown in a lower half part of the list of FIG. 10, the position of the job c is replaced with the job d in the job list, and thereby the heating section 40Ca is not required to perform heating after the execution of the job D. Consequently, the heating time of the heating section 40Ca is shortened by 20 minutes to be 15 minutes in comparison with the case of the timing chart in the upper half part of FIG. 10.

Next, another example of the job registration when the jobs are input during the warm-up operation will be described.

Figure 11:
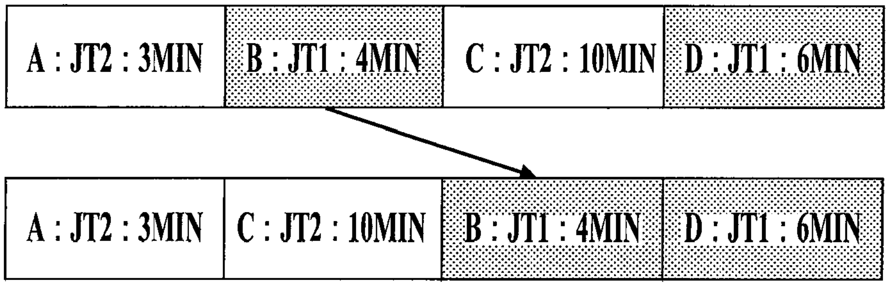
FIG. 11 is a diagram for explaining about the procedure for determining the job execution order.

As shown in an upper half part of the list of FIG. 11, an operator sequentially inputs jobs a-c (job A: job type 2, 3 minutes of processing time, job B: job type 1, 4 minutes of processing time, job C: job type 2, 10 minutes of processing time). Since the job A is job type 2 (Step S104 in FIG. 6), no job of job type 1 is registered in the job list at the time of inputting the job B (Step S105 in FIG. 6), and the job C is job type 2 (Step S104 in FIG. 6), the registration order of the job list is not changed, and the jobs a-c are registered in the job list in the order of inputting (Step S109 in FIG. 6).

Next, when a job D (job D: job type 1, 6 minutes of processing time) is input, since the job of the job type 1 is registered in the job list at the time of inputting the job D (Step S105 in FIG. 6), since both of the job of the job type 1 and the jobs of the job type 2 exist (Step S106 in FIG. 6), and since the job C of job type 2 is registered behind the job B which is the first job of job type 1 (Step S107 in FIG. 6), the warm-up operation residual time is calculated after obtaining the warm-up completion time information from the bookbinding apparatus C. Because the job A of job type 2 is registered in front of the first job of job type 1, the residual warm-up operation time is 12 minutes if the obtained warm-up completion time is supposed to be 15 minutes. Because the processing time for the job C is shorter than the warm-up operation residual time (Step S114 in FIG. 7), as shown in a lower half part of the list of FIG. 11, the job C is arranged in front of the job B, and the job B is slid rearward. Since no job of job type 2 exists behind the first job of job type 1 in the job list (Step S117 in FIG. 7), the presently input job D is arranged at the position just behind the job B the order of which has changed (Step S118 in FIG. 7).

The relations between the processing times of the registered jobs of the example shown in FIG. 11 and the heating times of the heating section 40Ca will be described with reference to FIG. 12.

Figure 12:
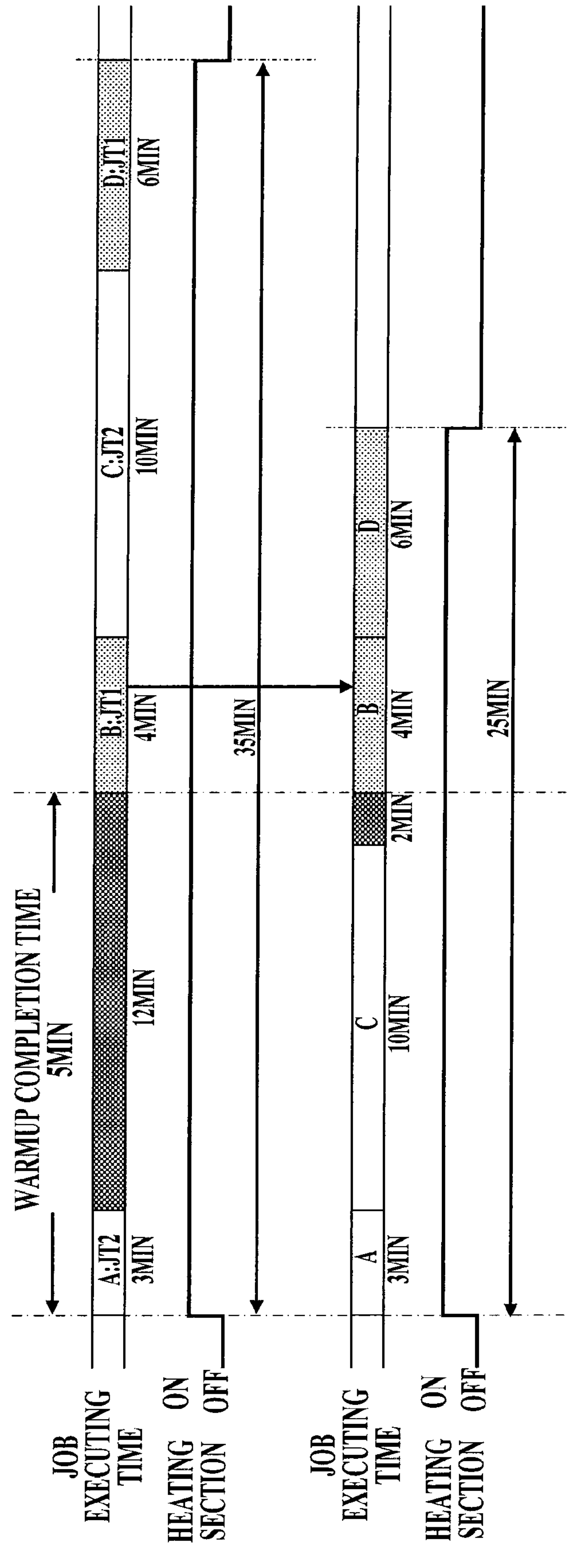
FIG. 12 is a diagram for explaining the relation between determination of the job execution order and each heating time.

As shown in the timing chart in an upper half part of FIG. 12, in the case where the job order is not changed and the jobs are performed in accordance with the order of inputting, after the execution of the job A, the execution of the job B of job type 1 is suspended until the completion of the warm-up operation, and thereby a waiting time of 12 minutes is produced. After that, if the jobs b-d are sequentially performed, the heating section 40Ca of the applying section 40C is led to continue heating for 35 minutes.

On the other hand, according to the embodiment of the present invention, as shown in the timing chart in a lower half part of FIG. 12, the position of the job b is replaced with the job c in the job list, and thereby the job C can be executed in addition to the job A during the warm-up operation. Hence, the waiting time is shortened to 2 minutes. After that, the jobs b and d are sequentially executed. Consequently, the heating time of the heating section 40Ca is led to be shortened by 10 minutes to be 25 minutes in comparison with the case of the timing chart in the upper half part of FIG. 12.

Next, the job registration in the case where the jobs are input in a ready state will be described.

Figure 13:
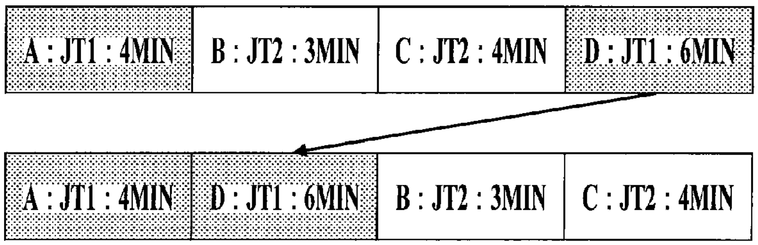
FIG. 13 is a diagram for explaining about the procedure for determining the job execution order.

As shown in an upper half part of the list of FIG. 13, an operator sequentially inputs jobs a-c (job A: job type 1, 4 minutes of processing time, job B: job type 2, 3 minutes of processing time, job C: job type 2, 4 minutes of processing time). Since no job of job type 1 exists in the job list at the time of inputting the job A (Step S205 in FIG. 8) and the jobs b and c are job type 2 (Step S204 in FIG. 8), the registration order of the job list is not changed, and the jobs a-c are registered in the job list in the order of inputting (Steps S208 and S206 in FIG. 8).

Next, when a job D (job D: job type 1, 6 minutes of processing time) is input, since the job of job type 1 is registered in the job list at the time of inputting the job D (Step S205 in FIG. 8), the job D is arranged at a position just behind the job A which is registered last among the registered jobs of job type 1 in the job list, as shown in a lower half part of the list of FIG. 13.

The relations between the processing times of the registered jobs of the example shown in FIG. 13 and the heating times of the heating section 40Ca will be described with reference to FIG. 14.

Figure 14:
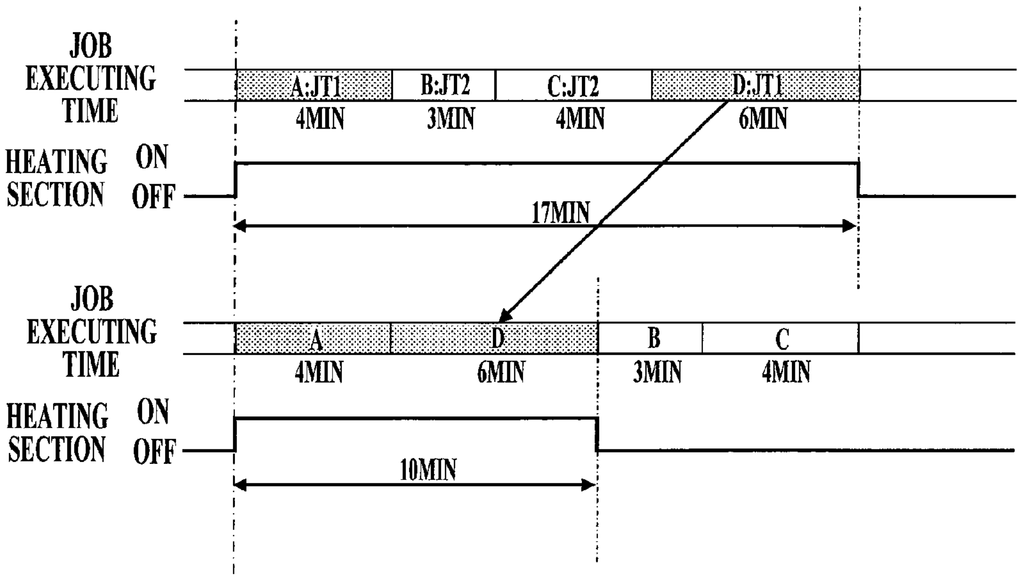
FIG. 14 is a diagram for explaining the relation between determination of the job execution order and each heating time.

As shown in the timing chart in an upper half part of FIG. 14, when the job execution order is not changed and the jobs a-d are executed in accordance with the order of inputting, the heating section 40Ca of the applying section 40C is led to continue heating for 17 minutes.

On the other hand, according to the embodiment of the present invention, as shown in the timing chart in a lower half part of FIG. 14, since the positions of the jobs b-d in the job list are changed, the heating section 40Ca is not required to perform heating after the execution of the job D. Consequently, the heating time of the heating section 40Ca is led to be shortened by 7 minutes to be 10 minutes in comparison with the case of the timing chart in the upper half part of FIG. 14.

Next, a second embodiment of the present invention will be described.

Figure 15:
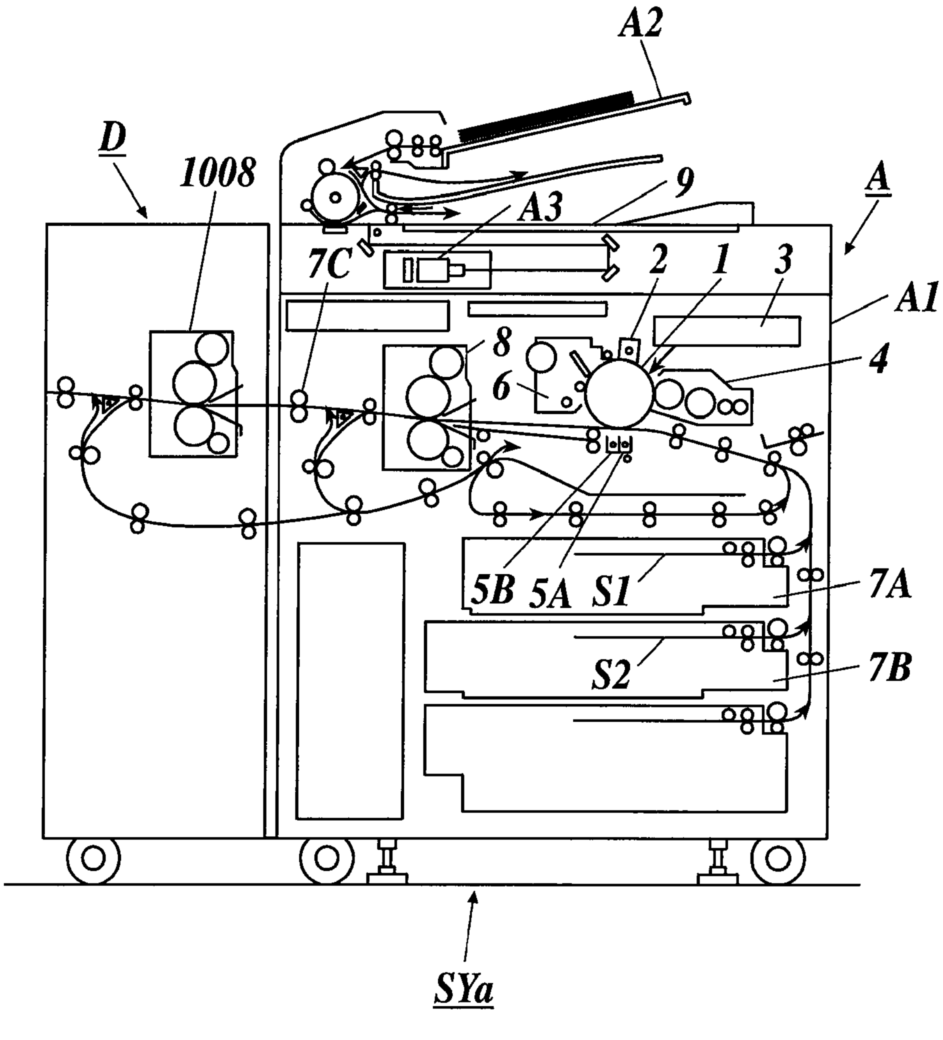
FIG. 15 is the overall configuration diagram of an image forming system according to another embodiment.

As shown in FIG. 15, an image forming system SYa of the present embodiment arranges a second fixing device D in place of the sheet processing apparatus FS of the first embodiment.

Only the second fixing device D will be described here. Because the image forming apparatus body A is similar to that described with regard to the first embodiment, the description thereof is omitted.

The second fixing device D as the processing apparatus is equipped with a second fixing section 1008. The second fixing section 1008 further fixes the toner image formed on each of the sheets S1 or the like ejected from the image forming apparatus body A. A second fixing processing by the second fixing section 1008 is selectively performed depending on the quality of sheets for example, and fixing rollers of the second fixing section 1008 are heated according to execution of the second fixing processing.

Also the second fixing section 1008 including the fixing rollers is the processing apparatus requiring the warm-up operation when the second fixing processing is executed. Since a sufficient time (for example 5 to 10 minutes) is necessary until the fixing rollers are heated to a sufficient temperature, the heating time of the fixing roller can be shortened by continuously executing a plurality of jobs each of which executes the second fixing processing, similarly to the first embodiment, so that the efficiency can be improved.

As described above, according to the present embodiment, the CPU 101 specifies whether each of a plurality of input jobs is a first job requiring the applying processing by the applying section 40, a first job requiring the second fixing by the second fixing section 1008, a second job unrequiring applying processing, or a second job unrequiring second fixing. Then, if a plurality of first jobs are input in addition to the second job, the CPU 101 determines the execution order of the jobs so that the first jobs are successively be executed. As a result, the heating times of the applying section 40C as the processing apparatus and/or the second fixing section 1008 can be shortened, and the energy efficiency necessary for a warm-up operation can be improved.

According to the present embodiment, the CPU 101 specifies the warm-up completion time which is a time until the completion of the warm-up operation of the applying section 40C or the second fixing section 1008, and the processing time of an input second job. Then, the CPU 101 judges whether or not the processing time for the second job is within the range of the warm-up completion time of the applying section 40C or the second fixing section 1008 as the processing apparatus. When the CPU 101 judges that the processing time for the second job is within the range of the warm-up completion time, the CPU 101 determines the job execution order so that the second job is executed in priority to the first jobs. When the CPU 101 does not judge that the processing time for the second job is not within the range of the warm-up completion time, the CPU 101 determines the job execution order so that the second job is executed consecutively to the first jobs which are successively executed. As a result, the second job can be executed during the warm-up operation so that the time during the warm-up operation can be effectively utilized. Consequently, the work efficiency is improved, and the heating time in the applying section 40C or the second fixing section 1008 can be shortened. Also the improvement of the energy efficiency can be achieved.

According to the present embodiment, the CPU 101 determines the job execution order so that first jobs have execution priorities when the warm-up operation of the applying section 40C or the second fixing section 1008 is completed. Consequently, the first jobs can rapidly be executed in the warmed-up state, and the work efficiency can be improved. Furthermore, since maintaining a heating state is unnecessary before the execution of the first job, the energy efficiency can further be improved.

According to the first embodiment, when the accumulation quantity of the adhesive 63 does not reach a predetermined quantity on the basis of a detection result by the accumulation quantity detecting section 64, the CPU 101 suspends the execution of the first jobs so that the second job has an execution priority. Consequently, the works are prevented from being interrupted owing to the shortage of the adhesive 63, and the operation efficiency can be improved.

According to the first embodiment, when the booklets S3 accumulated in the sheet accumulating section 82 reach a predetermined quantity, the CPU 101 suspends the execution of the first jobs so that the second job has an execution priority. Consequently, the works are prevented from being interrupted owing to the fact that the sheets such as the booklets S3 are accumulated in the sheet accumulating section 82 to the degree of making it impossible to eject the sheets, and the operation efficiency can be improved.

Although the present embodiment executes the second job in priority to the first jobs during the warm-up operation of the applying section 40C or the second fixing section 1008, it is also possible to place no priority on the execution of the second jobs during the warm-up operation.

Although the present embodiment executes the second job in priority to the first jobs when the processing time for the second job is shorter than the warm-up completion time during the warm-up operation of the applying section 40C or the second fixing section 1008, it is also possible to execute the second job in priority to the first jobs even when the processing time for the second job is longer than the warm-up completion time. In this case, it is preferable that the time exceeding the warm-up completion time is as short as possible.

Although the present embodiment executes the first jobs in priority to the second job when the warm-up operation of the applying section 40C or the second fixing section 1008 is completed, it is also possible to execute the first jobs after the second job is previously executed when the second job is input before the first jobs are input, for example.

Although the first embodiment suspends the execution of the first jobs so that the second job has an execution priority when the accumulation quantity of the adhesive does not reach a predetermined quantity, the first embodiment may be configured without such function.

Although the first embodiment is configured to supply the adhesive depending on the accumulation quantity of the adhesive in the adhesive accumulating section, as a mode of the supply, supplying a liquid adhesive may be adopted. Furthermore, for example, the mode of providing a hopper which accumulates many solid adhesives, appropriately supplying the solid adhesives to the adhesive accumulating section depending on the accumulation quantity of the adhesives in the adhesive accumulating section, and dissolving the solid adhesives by heating with the heating section to supply the adhesive, may be adopted.

Furthermore, the first embodiment suspends the first jobs so that the second job has an execution priority when a predetermined quantity of sheets is accumulated in the sheet accumulating section, but the first embodiment may not have such function.

Furthermore, the image forming apparatus of the first embodiment obtains the information indicating the processing time (finishing time) calculated by the folding processing apparatus or the bookbinding apparatus to calculate the processing time for the job, but the image forming apparatus itself may be configured to perform calculation regarding the information indicating the finishing time.

Although the embodiment explains about the examples of the applying section and the second fixing section as the processing apparatuses, the present invention can be applied to any processing apparatus as long as the processing apparatus requires the warm-up operation. For example, the present invention can be applied to a binding section for binding one side of the sheet bundle with a binding tape. Because a binding tape on which a hot melt type adhesive is applied is used as the binding section, the binding tape needs to be heated by the hearing section as being pasted on the sheet bundle. For this reason, the warm-up operation for heating the heating section beforehand becomes necessary. When the warm-up requiring job is executed and then the warm-up requiring job is further executed after the execution of the warm-up unrequiring jobs, the processing apparatus needs to continuously be heated even during the execution of the warm-up operation unrequiring jobs in order to prevent the temperature from lowering. However, by applying the present invention, the heating time can be shortened and the energy efficiency owing to the warm-up operation can be improved.

Although the applying section and the second fixing section as the processing apparatuses of the present embodiment are arranged in separate units from the image forming apparatus body, the applying section and the second fixing section may be arranged in the image forming apparatus body.

Furthermore, the examples using a hard disk, a semiconductor nonvolatile memory, and the like, as a computer-readable media for the programs of the present invention are disclosed in the present embodiment, but the computer-readable media are not limited to the examples. As the other computer-readable media, a portable type recording medium such as a compact disc read-only memory (CD-ROM) can be applied. Also a carrier wave can be applied as a medium for providing the program data of the present invention through a communication line.

The present U.S. patent application claims a priority under the Paris Convention of Japanese patent application No. 2009-253655 filed on 5 Nov. 2009, which shall be a basis of correction of an incorrect translation.

What is claimed is:

1. An image forming apparatus equipped with a processing apparatus which requires a warm-up operation of a predetermined time and performs a predetermined processing to an image-formed sheet, the apparatus comprising:

a control section to specify whether each of a plurality of input jobs is a first job requiring the processing by the processing apparatus or a second job requiring no processing by the processing apparatus, and to determine an execution order of the plurality of input jobs so that, when the plurality of input jobs include both a plurality of first jobs and a second job, the plurality of first jobs are successively executed; and an image forming section to sequentially execute the plurality of input jobs in accordance with the execution order which is determined by the control section.

2. The image forming apparatus of claim 1, wherein:

the control section specifies a warm-up completion time which is a time until the warm-up operation of the processing apparatus is completed, and a processing time for the input second job;

the control section judges whether or not the processing time for the second job is within a range of the warm-up completion time;

when the control section judges that the processing time for the second job is within the range of the warm-up completion time, the control section determines the job execution order so that the second job is executed in priority to the first jobs; and when the control section does not judge that the processing time for the second job is within the range of the warm-up completion time, the control section determines the job execution order so that the second job is executed consecutively to the first jobs which are successively executed.

3. The image forming apparatus of claim 1, wherein the control section determines the job execution order so that the first jobs have execution priorities when the warm-up operation of the processing apparatus is completed.

4. The image forming apparatus of claim 1, wherein the processing apparatus is a finishing device which applies an adhesive to the image-formed sheet, the processing apparatus including:

an adhesive accumulating section to accumulate the adhesive; and an accumulation quantity detecting section to detect an accumulation quantity of the adhesive accumulated in the adhesive accumulating section, wherein the control section makes the image forming section suspend an execution of the first jobs so that the second job has an execution priority when the accumulation quantity of the adhesive does not reach a predetermined quantity as a detection result by the accumulation quantity detecting section.

5. The image forming apparatus of claim 1, further comprising:

an ejecting section to eject the sheet processed by the processing apparatus; and a sheet accumulating section to accumulate sheets ejected by the ejecting section, wherein the control section makes the image forming section suspend execution of the first jobs so that the second job has an execution priority when the sheets accumulated in the sheet accumulating section reach a predetermined quantity.

6. A method for controlling an image forming apparatus equipped with a processing apparatus which requires a warm-up operation for a predetermined time and performs a predetermined processing to an image-formed, the method comprising:

specifying whether each of a plurality of input jobs is a first job requiring the processing by the processing apparatus or a second job requiring no processing by the processing apparatus;

determining an execution order of the plurality of input jobs so that, when the plurality of input jobs include both a plurality of first jobs and a second job, the plurality of first jobs are successively executed; and sequentially executing the plurality of input jobs in accordance with the determined execution order.

7. The method for controlling an image forming apparatus of claim 6, the method further comprising:

specifying a warm-up completion time which is a time until the warm-up operation of the processing apparatus is completed, and a processing time for the input second job;

judging whether or not the processing time for the second job is within a range of the warm-up completion time;

determining the job execution order so that the second job is executed in priority to the first jobs when it is judged that the processing time for the second job is within a range of the warm-up completion time; and determining the job execution order so that the second job is executed consecutively to the first jobs which are successively executed when it is not judged that the processing time for the second job is within the range of the warm-up completion time.

8. The method for controlling an image forming apparatus of claim 6, further comprising determining the job execution order so that the first jobs have execution priorities when the warm-up operation of the processing apparatus is completed.

9. The method for controlling an image forming apparatus of claim 6, wherein the processing apparatus is a finishing device which applies an adhesive to the image-formed sheet, and the processing apparatus detects an accumulation quantity of the adhesive accumulated in an adhesive accumulating section which accumulates the adhesive, and when the accumulation quantity of the adhesive does not reach a predetermined quantity, the method further comprises suspending an execution of the first jobs so that the second job has an execution priority.

10. The method for controlling an image forming apparatus of claim 6, further comprising suspending an execution of the first jobs so that the second job has an execution priority when sheets to be ejected accumulated in an accumulating section which accumulates the sheets which are processed by the processing apparatus reach a predetermined quantity.

* * * * *